(12) United States Patent
Harvey et al.

(10) Patent No.: US 6,746,603 B2
(45) Date of Patent: Jun. 8, 2004

(54) FUEL FILTERING SYSTEM WITH VALVE

(75) Inventors: Richard W. Harvey, Logansport, IN (US); Larry J. Tipton, Saint Ann, MO (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 120 days.

(21) Appl. No.: 10/164,881

(22) Filed: Jun. 7, 2002

(65) Prior Publication Data

US 2003/0000882 A1 Jan. 2, 2003

Related U.S. Application Data

(60) Provisional application No. 60/297,062, filed on Jun. 8, 2001.

(51) Int. Cl.$^7$ .................... B01D 35/26; B01D 35/157
(52) U.S. Cl. ............... 210/234; 210/235; 210/416.4; 123/509; 123/510
(58) Field of Search .................. 210/234, 235, 210/416.4; 123/509, 510

(56) References Cited

U.S. PATENT DOCUMENTS

| | | |
|---|---|---|
| 4,222,875 A | 9/1980 | Sikula, Jr. |
| 4,529,514 A | 7/1985 | Gruett |
| 5,049,269 A | 9/1991 | Shah |
| 5,392,750 A * | 2/1995 | Laue et al. .................. 123/509 |
| 5,564,396 A * | 10/1996 | Kleppner et al. ........... 123/509 |
| 5,698,093 A | 12/1997 | Pyle et al. |
| 5,958,237 A | 9/1999 | Cort et al. |
| 6,113,781 A | 9/2000 | Popoff et al. |
| 6,189,513 B1 * | 2/2001 | Brown et al. ................ 123/497 |
| 6,495,042 B1 * | 12/2002 | Knight ................... 210/497.01 |

* cited by examiner

Primary Examiner—Thomas M. Lithgow
(74) Attorney, Agent, or Firm—Baker & Daniels

(57) ABSTRACT

A fuel filtering system having a valve which prevents the flow of fuel in the absence of a fuel filter. The filtering system includes a housing in which a fuel pump is at least partially disposed. A valve mechanism is located on the discharge side of the fuel pump and includes a valve member which is movable between open and closed positions which, respectively, allow and prevent fluid flow through the fuel line. A biasing member is provided for biasing the valve member into the closed position. The valve member is engaged by the mounting of the fuel filter to thereby open the valve mechanism. In the absence of an installed fuel filter, the valve member remains in the closed position to prevent the flow of unfiltered fuel to the engine.

14 Claims, 2 Drawing Sheets

FUEL FILTERING SYSTEM WITH VALVE

CROSS REFERENCE TO RELATED APPLICATIONS

This application claims priority under 35 U.S.C. 119(e) of U.S. provisional patent application serial No. 60/297,062 filed on Jun. 8, 2001 entitled AUTOMATIC FUEL PUMP OUTLET SHUT-OFF VALVE.

BACKGROUND OF THE INVENTION

1. Field of the Invention

The present invention relates to fuel shut-off valves for engines, and, more particularly, to an automatic fuel pump outlet shut-off valve for diesel engines.

2. Description of the Related Art

Engines are typically connected to a fuel storage tank via a fluid system including a fuel pump for conveying fuel from the tank to the engine. In a fluid system such as that typically located in a vehicle, a filter is disposed in the fuel line extending between the fuel tank and the engine at a location upstream from the engine. The filter functions to remove contaminants from the fuel which can cause damage to the internal components of the engine. Over time, a fuel filter can become obstructed and cause substandard vehicle operation, thereby making servicing of the fuel filter a priority. When this occurs, the vehicle operator may be tempted to remove the fuel filter to increase vehicle performance. If the fuel filter is removed, contaminants located within the fuel are not removed and are allowed to circulate through the vehicle's engine. The free flow of contaminants through the engine can cause problems including collection of particles within the valves of the engine, clogging of fuel injector jets, or scoring of the internal surfaces of the engine. Furthermore, if the vehicle has been operated with the fuel filter removed, service providers may be reluctant to honor warranties for damaged parts.

Alternatively, the vehicle operator may choose to service or replace the fuel filter. To perform service or replacement of the filter, the filter lid must be removed. When the filter lid is removed, a potential hazard exists for spraying fuel on to a service person and engine if the ignition is inadvertently turned to the "on" position, thereby energizing the fuel pump.

SUMMARY OF THE INVENTION

The present invention provides an automatic pump outlet shut-off valve. The shut-off valve is illustrated for use in a diesel engine, but may also be used in other engine types. The shut-off valve prevents operation of the engine if a fuel filter is not present. Additionally, the disclosed valve permits engine operation only after the filter lid is tightened and properly positions the filter within the filter cavity. The disclosed valve also prevents the discharge of fuel from the fuel pump when the filter lid is removed to replace or service the fuel filter.

The present invention, in one form thereof, comprises a fuel filtering system for use in a fuel line extending between a fuel source and an engine which includes a fuel pump operably disposed in the fuel line between the fuel source and the engine and a valve member operably disposed in the fuel line between said fuel pump and the engine. The valve member has an open position and a closed position wherein the valve member permits passage of fuel through the fuel line when in the open position and prevents the passage of fuel through the fuel line when in the closed position. A biasing member engaged with the valve member biases the valve member towards the closed position. A fuel filter is mountable in the fuel filtering system and has a filter structure and a filter element extending from the filter structure. The filter element defines an interior volume and the fuel pump is at least partially disposed within the interior volume of the filter element. An actuating surface is located on the valve member and is engageable to bias the valve member towards its open position. Mounting the fuel filter to the fuel line engages the fuel filter with the actuating surface and thereby moves the valve member into the open position.

The fuel filtering system described above, may also include a housing defining a filter cavity with the fuel filter being positionable within the filter cavity. A removably attachable lid provides access to the filter cavity and also secures the fuel filter within the cavity. At least a portion of the fuel pump and the valve member are disposed within the housing and are positioned so that the valve member prevents the entry of fuel into the filter cavity when the valve member is in the closed position. The lid may also be configured whereby attachment of the lid to the housing biases a fuel filter located within the filter cavity into engagement with the actuating surface and thereby moves the valve member into the open position and wherein the lid is spaced from the actuating surface when the lid is attached to the housing and the valve is in the closed position whereby the valve member remains in the closed position when the lid is attached to the housing in the absence of the fuel filter.

The present invention, in another form thereof, comprises a fuel filtering system for use in a fuel line extending between a fuel source and an engine. The system includes a filter housing defining a filter cavity wherein the filter cavity defines a portion of the fuel line. A fuel pump is operably disposed in the fuel line between the fuel source and the engine and is at least partially disposed within the housing. A valve mechanism having a body defining a valve opening and a valve member operably disposed within said valve opening defines a second portion of the fuel line and is disposed in the fuel line between the fuel pump and the filter cavity. The valve member has an open position and a closed position wherein the valve member permits passage of fuel through the fuel line when in the open position and prevents passage of fuel through the fuel line when in the closed position. A biasing member is engaged with the valve member and biases the valve member towards the closed position. A fuel filter is mountable within the filter cavity and has a filter structure and a filter element extending from the filter structure. The filter element defines an interior volume and the fuel pump is at least partially disposed within said interior volume. An actuating surface is located on the valve member and is engageable to bias the valve member towards the open position. Mounting the fuel filter within the filter cavity engages the filter structure with the actuating surface and moves the valve member into the open position.

The above described fuel filtering system may have a filter structure which sealingly engages the valve body proximate the valve opening and defines at least one passage proximate the valve opening. Fuel flowing through the valve opening towards the engine is thereby inhibited from directly entering the interior volume of the fuel filter by the sealing engagement of the filter structure with the valve body and is communicated to the filter cavity through the at least one passage.

The fuel filtering system may also include a lid removably attachable to the housing, removal of the lid providing access to the filter cavity and attachment of the lid securing the fuel filter within the filter cavity. The lid may also be configured whereby attachment of the lid to the housing biases a fuel filter located within the filter cavity into engagement with the actuating surface and thereby moves the valve member into the open position and wherein the lid is spaced from the actuating surface when the lid is attached to the housing and the valve is in the closed position whereby the valve member remains in the closed position when the lid is attached to the housing in the absence of the fuel filter.

The valve body of such fuel filtering systems may be disposed on the fuel pump with the valve opening defining the fuel pump outlet.

The valve member of such fuel filtering systems may also include a first major surface wherein when the valve member is in the closed position the first major surface is positioned so that impingement of fuel in the fuel line on the valve member biases the valve member towards the closed position An advantage of the present invention is that it provides a simple, low cost, and effective fuel shut-off valve for a fuel filter and fuel pump combination.

Another advantage of the present invention is that it provides a fuel shut-off valve which prevents the engine from starting if a fuel filter is not installed.

Yet another advantage of the present invention is that it provides a shut-off valve which, when the filter lid is removed, automatically prevents the discharge of fuel from the fuel pump to prevent the spraying of fuel into the surrounding environment.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
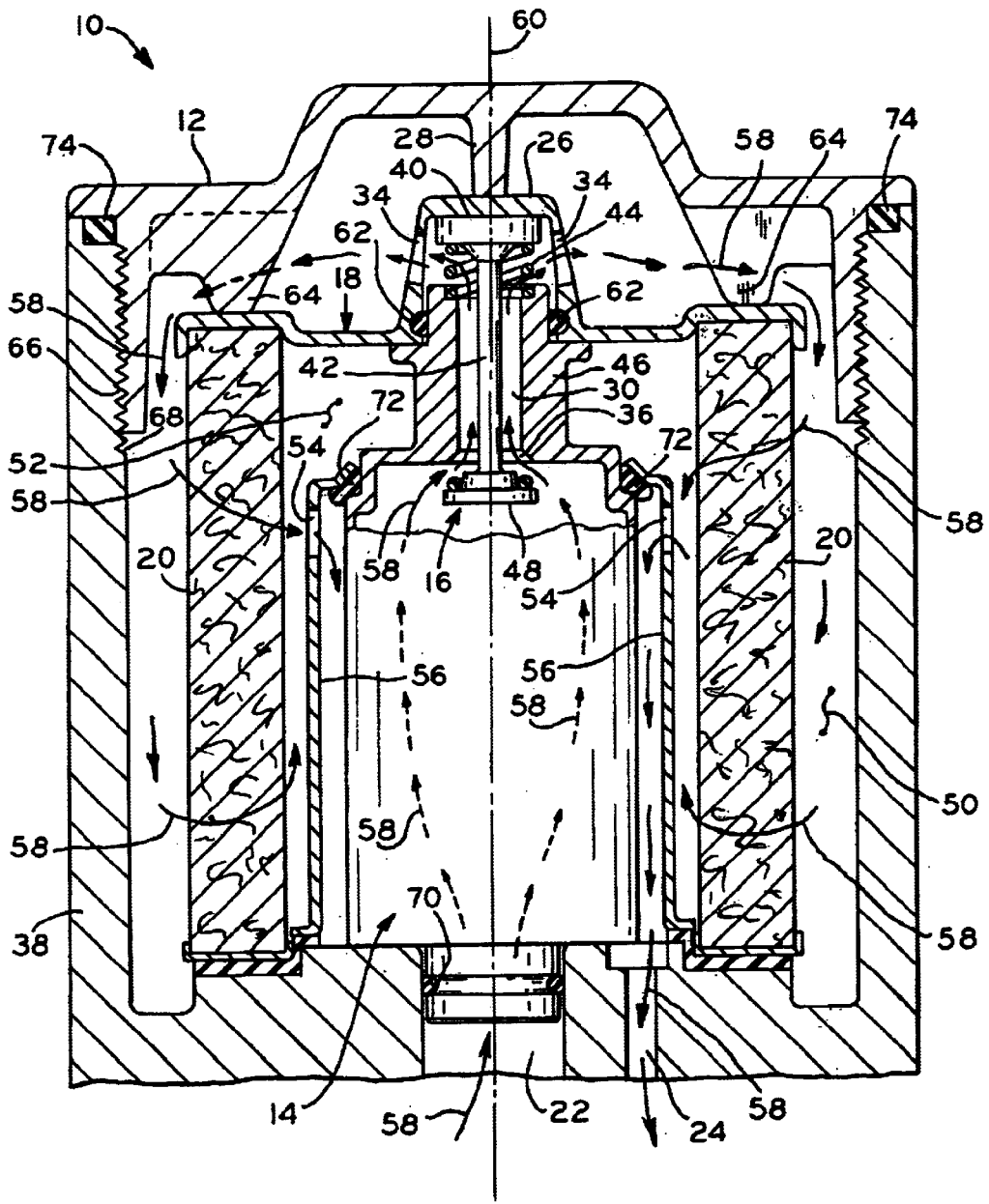
FIG. 1 is a diagram illustrating a fuel filtering system in accordance with the present invention with an installed fuel filter.

Referring now to the drawings and particularly to FIG. 1, there is shown fuel filtering system 10 in normal operation with fuel filter 18 in position. During normal operation, filter 18 surrounds and encloses fuel pump 14. Filter lid 12 is removably attached to housing 38. When filter lid 12 is threadingly secured to housing 38, projection 28 on the interior of filter lid 12 contacts filter structure 26 of filter 18 and biases filter 18 towards fuel pump 14. Filter structure 26 engages actuating surface 40 located on valve member 42 to thereby bias valve member 42 into its open position.

Figure 2:
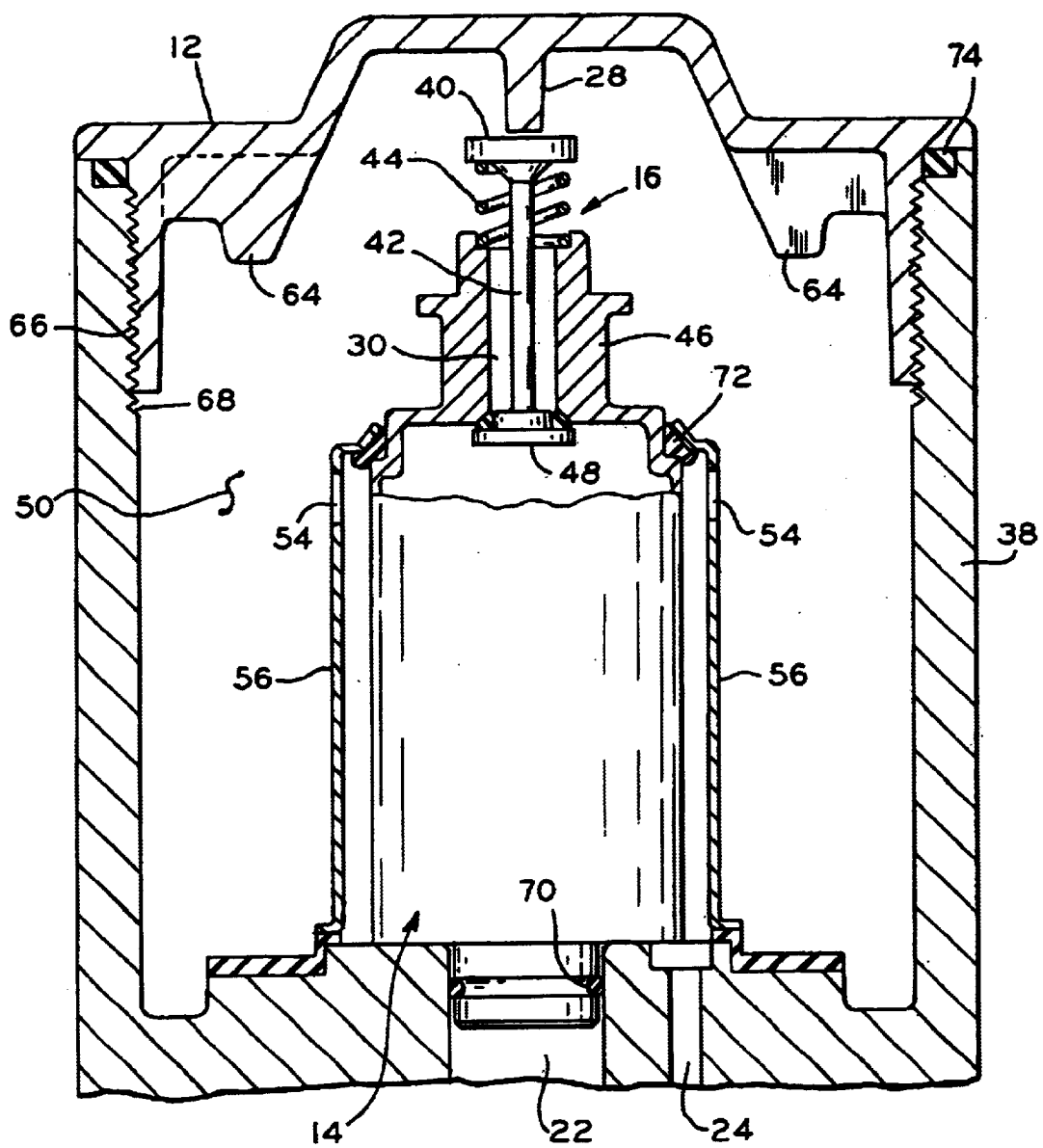
FIG. 2 is a diagram illustrating the fuel filtering system of FIG. 1 in the absence of a fuel filter.

The operation of valve mechanism 16 is shown in FIGS. 1 and 2. A biasing member 44, which in the illustrated embodiment is a spring, biases valve member 42 toward a closed position. In the absence of other forces, biasing member 44 maintains valve member 42 in its closed position wherein valve member 42 is in sealing engagement with valve seat 36. Mounting fuel filter 18 within fuel filter cavity 50 results in the biasing engagement of filter structure 26 with actuating surface 40 and thereby biases valve member 44 out of engagement with valve seat 36 into an open position as shown in FIG. 1. In the illustrated embodiment, as lid 12 is secured to housing 38, portion 28 of lid 12 biases fuel filter 18 into engagement with actuating surface 40. Lid 12 also engages fuel filter 18 with projections 64 located on the lower surface of lid 12. Projections 64 engage filter structure 26 proximate the location where filter element 20 extends therefrom. Alternative configurations of lid 12 and filter structure 26 may also be used whereby the mounting of fuel filter 18 within fuel filtering system 10 results in the biasing engagement of actuating surface 40 and the opening of valve mechanism 16.

As can be seen in FIG. 2, valve member 42 also includes a first major surface 48 which is positioned, when valve member 42 is in the closed position, so that impingement of the fuel in the fuel line on valve member 42, i.e., impingement of the fuel within fuel pump 14 on valve member 42, biases valve member 42 towards its closed position. Since first major surface 48 forms a substantial majority of the surface area of valve member 42 which is exposed to fluid pressure when valve member 42 is in the closed position, activation of fuel pump 14 with valve member 42 in the closed position will not overcome the biasing forces of biasing member 44 and move valve member 42 into its open position.

Valve mechanism 16 includes a valve body 46 through which valve opening 30 extends. Valve member 42 is operably disposed in cylindrically shaped valve opening 30. Valve seat 36 is located at one end of valve opening 30 and is sealingly engageable with valve member 42. Valve body 46 is located on the discharge end of fuel pump 14 and valve seat 36 defines the fuel pump outlet.

In operation, fuel enters via fuel entry line 22 from a fuel tank (not shown) and proceeds into fuel pump 14. Fuel exits pump 14 via fuel pump outlet 36 and continues through valve opening 30 which thereby forms a portion of the fuel line. Fuel moves through passage 34 in fuel structure 26 and enters filter cavity 50. After being filtered by filter element 20, fuel enters the interior volume 52 defined by fuel filter 18. Filter cavity 50, fuel filter 18 and interior volume 52 all have a generally cylindrical shape. Fuel flows from interior volume 52 through apertures 54 in inner housing wall 56 and exits fuel filtering system 10 via fuel exit line 24. Fuel exit line 24 conveys the fuel to an engine (not shown). The general path of fuel flow can be seen as referenced by fuel flow direction arrows 58 shown in FIG. 1. As shown by arrows 58 fuel flows through fuel entry line 22, fuel pump 14, valve opening 30, passages 34, filter cavity 50, interior volume 52, apertures 54 and fuel exit line 24 in that order and all of these items form a portion of the fuel line which extends from a fuel source such as a fuel tank (not shown) to an engine (not shown).

When filter lid 12 is removed from housing 38, valve mechanism 16 automatically closes, as discussed in greater detail below, thereby preventing the potential spraying fuel through pump outlet 36. Such spraying is undesirable since it could allow fuel to be sprayed onto a service person or hot engine if the ignition key is inadvertently turned to the "on" position while the filter lid 12 is removed.

As can be seen in FIG. 1, filter structure 26 sealingly engages valve body 46 proximate valve opening 30 whereby fluid flowing in the fuel line towards the engine flows through valve opening 30 and then through a passage 34 located in filter structure 26 into filter cavity 50 (which forms a portion of the fuel line leading to the engine). The sealing engagement of filter structure 26 with valve body 46 utilizes a sealing member 62 and prevents fluid from directly entering interior volume 52 of fuel filter 18 and requires fuel exiting valve opening 30 to be communicated to filter cavity 50 though passage 34 and enter interior volume 52 by passing through filter element 20 which, in the illustrated embodiment, is a paper filter element. As shown in the Figures, sealing members 70, 72, and 74 are used to provide filter cavity 50 with a fluid tight seal.

Lid 12 is provided with helical threads 66 which are engageable with helical threads 68 located on housing 38 whereby lid 12 is removably attachable to housing 38 of fuel filtering system 10. Removal of lid 12 provides access to filter cavity 50 whereby a spent fuel filter 18 may be replaced or repaired or other components, e.g., valve mechanism 16 or fuel pump 14, which are at least partially disposed within filter cavity 50 defined by housing 38 may be accessed. Attachment of lid 12 to housing 38 with fuel filter 18 is mounted in fuel filtering system 10 by positioning fuel filter 18 within filter cavity 50 and attaching lid 12 whereby lid 12 secures the fuel filter 18 within filter cavity 50 and causes the opening of valve mechanism 16.

The fuel pump 14 is positioned within housing 38 and is operably disposed in the fuel line between the fuel source and the engine. Valve body 46 extends from fuel pump 14 and defines valve opening 30 which defines a second portion of the fuel line disposed in the fuel between the fuel pump 14 and the filter cavity 50. Fuel filter 18 defines an interior volume 52 and when filter 18 is mounted in filter cavity 50, fuel pump 14 is partially disposed within interior volume 52 as shown in FIG. 1. As can also be seen in FIG. 1, filter cavity 50, fuel pump 14, fuel filter 18, valve opening 30, valve member 42, and lid 12 are all positioned along a common axis 60.

In FIG. 2, fuel filter 18 is not present in filter cavity 50. When lid 12 is attached to housing 38 in the absence of fuel filter 18 as shown in FIG. 2, lid 12, including portion 28, is spaced from actuating surface 40 of valve member 42 which is in the closed position. Thus, because lid 12 does not engage actuating surface 40, or otherwise biasingly engage valve member 42, valve member 42 remains in the closed position when lid 12 is attached to housing 38 in the absence of fuel filter 18 and fuel is thereby prevented from entering into filter cavity 50. By preventing the passage of fuel through valve mechanism 16 when the fuel filter 18 is not present to filter contaminants from the fuel, fuel filtering system 10 prevents unfiltered fuel from reaching the engine and avoids the potential injector damage, the collection of contaminant particles within the valves of the engine, clogging of fuel injector jets, and scoring of the internal surfaces of the engine which can result from the use of unfiltered fuel.

It should also be understood that while the mechanical interconnection in the valve has been shown to shut the outlet valve of the fuel pump, an alternative arrangement could be used, such as a switch which is activated when both filter lid 12 and fuel filter 18 are secured in place. Such a switch would be in the closed position when the fuel filter 18 is installed and the filter lid 12 is secured in place. However, if either the filter lid 12 or the fuel filter 18 were missing, the switch would be in the open position. Such a switch would be placed in series connection with the fuel pump, thereby automatically shutting off the fuel pump when no filter is in place and/or when the filter lid has not been secured to the filter housing.

By placing the valve mechanism 16 at the outlet of fuel pump 14, the closure of valve mechanism prevents the discharge of fuel from pump 14 when in the closed position. Placing valve mechanism 16 at the inlet to fuel pump 14 would not provide this advantage.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fuel filtering system for use in a fuel line extending between a fuel source and an engine, said system comprising:
    a fuel pump operably disposed in the fuel line between the fuel source and the engine;
    a valve member operably disposed in the fuel line between said fuel pump and the engine, said valve member having an open position and a closed position, said valve member permitting passage of fuel through the fuel line when in said open position and preventing passage of fuel through the fuel line when in said closed position;
    a biasing member biasing said valve member towards said closed position;
    a fuel filter mountable in said fuel filtering system, said fuel filter having a filter structure and a filter element extending from said filter structure, said filter element defining an interior volume, said fuel pump being at least partially disposed within said interior volume; and
    an actuating surface disposed on said valve member, said actuating surface being engageable to bias said valve member towards said open position and wherein mounting of said fuel filter in said fuel filtering system engages said fuel filter with said actuating surface and moves said valve member into said open position.

2. The fuel filtering system of claim 1 wherein said valve member includes a first major surface wherein when said valve member is in said closed position said first major surface is positioned so that impingement of fuel in the fuel line on said valve member biases said valve member towards said closed position.

3. The fuel filtering system of claim 1 further comprising a housing defining a filter cavity, said fuel filter being positionable within said filter cavity, and a removably attachable lid providing access to said filter cavity and securing said fuel filter within said filter cavity, at least a portion of said fuel pump and said valve member are disposed within said housing and said valve member prevents entry of fuel into said filter cavity when in said closed position.

4. The fuel filtering system of claim 3 wherein attachment of said lid to said housing biases said fuel filter into engagement with said actuating surface and thereby moves said valve member into said open position, said lid being spaced from said actuating surface when said lid is attached to said housing and said valve is in said closed position whereby said valve member remains in said closed position when said lid is attached to said housing in the absence of said fuel filter.

5. The fuel filtering system of claim 4 wherein said filter cavity, said fuel pump, said valve member, said fuel filter, and said lid are all positioned along a common axis.

6. The fuel filtering system of claim 1 further comprising a valve body defining a valve opening, said valve opening defining a portion of the fuel line, said valve member operably disposed within said valve opening, said filter structure sealingly engaging said valve body proximate said valve opening, said filter structure defining at least one passage proximate said valve opening wherein fuel flowing through said valve opening toward the engine is inhibited from directly entering said interior volume by said sealing engagement of said filter structure and said valve body and is communicated through the fuel line via said at least one passage.

7. The fuel filtering system of claim 6 wherein said valve body is disposed on said fuel pump and said valve opening includes a valve seat sealingly engageable with said valve member, said valve seat defining a fuel pump outlet.

8. A fuel filtering system for use in a fuel line extending between a fuel source and an engine, said system comprising:

a filter housing defining a filter cavity, said filter cavity defining a portion of the fuel line;

a fuel pump operably disposed in the fuel line between the fuel source and the engine, said fuel pump at least partially disposed within said housing;

a valve mechanism having a body defining a valve opening and a valve member operably disposed within said valve opening, said valve opening defining a second portion of the fuel line and disposed in the fuel line between the fuel pump and said filter cavity, said valve member having an open position and a closed position, said valve member permitting passage of fuel through the fuel line when in said open position and preventing passage of fuel through the fuel line when in said closed position;

a biasing member biasing said valve member towards said closed position;

a fuel filter mountable within said filter cavity, said fuel filter having a filter structure and a filter element extending from said filter structure, said filter element defining an interior volume, said fuel pump being at least partially disposed within said interior volume; and an actuating surface disposed on said valve member, said actuating surface being engageable to bias said valve member towards said open position and wherein mounting said fuel filter within said filter cavity engages said filter structure with said actuating surface and moves said valve member into said open position.

9. The fuel filtering system of claim 8 wherein said filter structure sealingly engages said valve body proximate said valve opening, said filter structure defining at least one passage proximate said valve opening wherein fuel flowing through said valve opening toward the engine is inhibited from directly entering said interior volume by said sealing engagement of said filter structure and said valve body and is communicated to said filter cavity through said at least one passage.

10. The fuel filtering system of claim 8 further comprising a lid removably attachable to said housing, removal of said lid providing access to said filter cavity and attachment of said lid securing said fuel filter within said filter cavity.

11. The fuel filtering system of claim 10 wherein attachment of said lid to said housing biases said fuel filter into engagement with said actuating surface and thereby moves said valve member into said open position, said lid being spaced from said actuating surface when said lid is attached to said housing and said valve is in said closed position whereby said valve member remains in said closed position when said lid is attached to said housing in the absence of said fuel filter.

12. The fuel filtering system of claim 8 wherein said valve member includes a first major surface wherein when said valve member is in said closed position said first major surface is positioned so that impingement of fuel in the fuel line on said valve member biases said valve member towards said closed position.

13. The fuel filtering system of claim 8 wherein said filter cavity, said fuel pump, said valve member and fuel filter are all positioned along a common axis.

14. The fuel filtering system of claim 8 wherein said valve body is disposed on said fuel pump and said valve opening includes a valve seat sealingly engageable with said valve member, said valve seat defining a fuel pump outlet.

* * * * *